June 22, 1971   E. T. FOLMAR   3,586,518
ELECTRIC BARBECUE MACHINE

Filed April 1, 1969   3 Sheets-Sheet 1

Earl T. Folmar
INVENTOR.

BY *Clarence A. O'Brien*
and *Harvey B. Jacobson*
Attorneys

Earl T. Folmar
INVENTOR.

June 22, 1971 E. T. FOLMAR 3,586,518
ELECTRIC BARBECUE MACHINE
Filed April 1, 1969 3 Sheets-Sheet 3
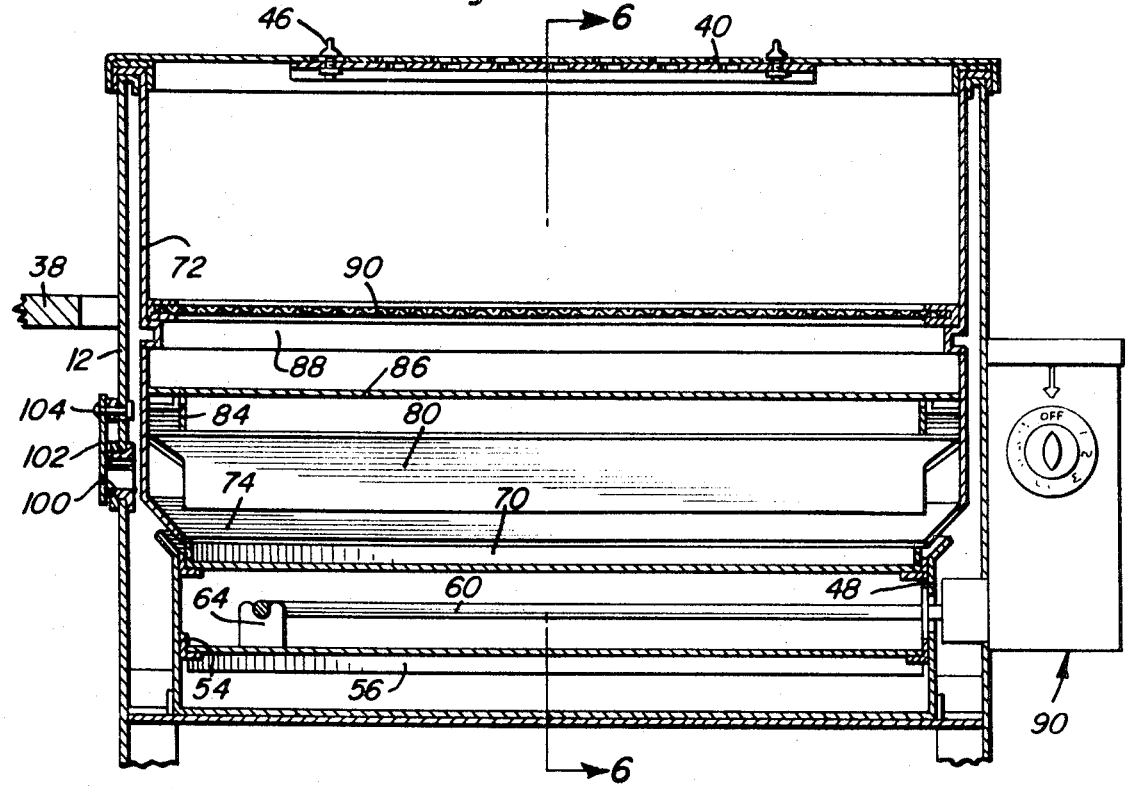
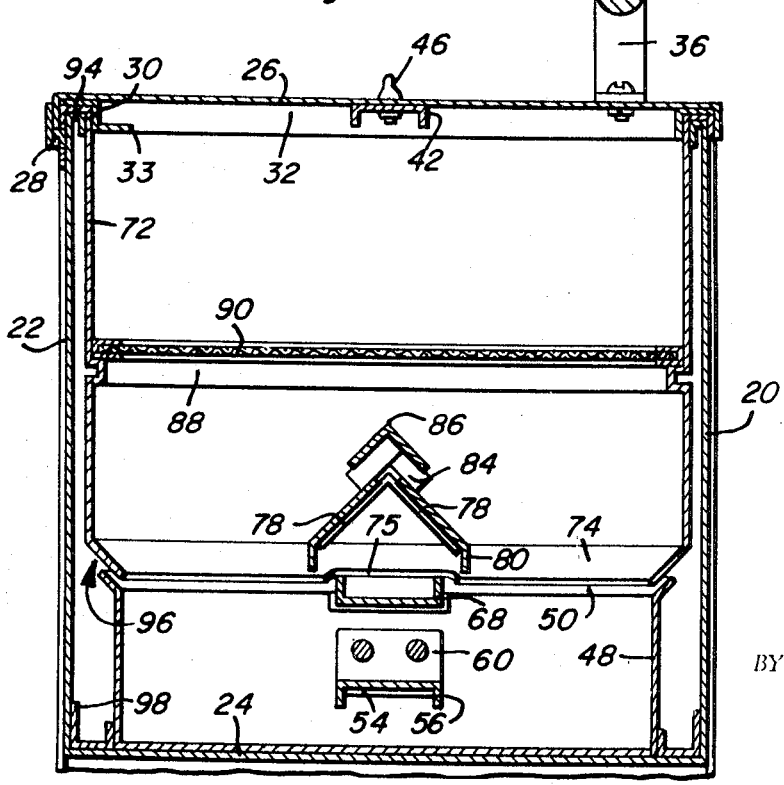
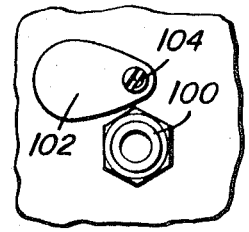
Earl T. Folmar
INVENTOR.
BY Clarence A. O'Brien
and Harvey B. Jacobson
Attorneys

United States Patent Office 3,586,518
Patented June 22, 1971

3,586,518
ELECTRIC BARBECUE MACHINE
Earl T. Folmar, Goshen, Ala.
(Rte. 3, Troy, Ala. 36081)
Filed Apr. 1, 1969, Ser. No. 812,150
Int. Cl. A23b 1/04
U.S. Cl. 99—259                                4 Claims

ABSTRACT OF THE DISCLOSURE

A portable barbecue machine having a heater assembly including a heater element positioned below a grill upon which food is placed to be cooked. An inverted angle iron is placed in vertical alignment over the heating element so that drippings are deflected away from the element. A tray may be positioned beneath the angle iron and immediately above the heating element, the tray allowing insertion of smoking materials such as charcoal, hickory or the like therein. The angle iron includes a slitted apex portion so that the smoke may pass therethrough to treat the food. A drippings deflector is placed over the slit in overlying spaced relation so that drippings are prevented from falling through the slit into the tray.

---

The present invention relates to electrical barbecue machines.

Most commercially available barbecuing machines are equipped with a bowl for retaining charcoal or like burnable material. A grill is usually adjustably mounted atop the bowl thereby allowing the heat intensity generated from the burning material to be varied. Although such barbecue devices are generally satisfactory, they require a great deal of attention during the burning process in addition to the inconvenience of loading and cleaning out the charcoal from the bowl. Certain other barbecuing devices include electrical heating elements or gas jet assemblies instead of charcoal. However, by employing such devices, it is not possible to achieve the smoke flavoring effect that is possible by using charcoal, hickory wood or the like. Still other barbecue machines utilize heating elements or burnable material with the drippings from the cooked food being collected on a foraminous plate which permits the passage of smoke from a smoking material to pass through the holes in the plate. In addition, such a plate permits the collection of drippings from the cooked food. A conduit is generally connected to such a plate to guide drainage of drippings from the plate to a collecting tray. Although this construction offers adequate service, the disadvantage of such a device resides in the large extending foraminous plate which restricts the passage of smoke from the smoking material therethrough.

The present invention employs an electrically controlled means for regulating the power supply to the heater element thereby allowing variation in heat intensity to which food is subjected without adjustment of the grill. Further, means are provided for retaining hickory wood or charcoal above an electrical element so that smoke is produced which treats the food being cooked. Deflecting or shield means are provided for preventing drippings from falling into the tray which is employed to retain the hickory, the deflecting means also preventing fat from splattering on the heating element. The heating element itself is elongated and narrow and the deflecting means is similarly shaped so that ample free space is created to permit the free flow of smoke therethrough for treating the food. Still further, the present invention is housed in an enclosure which has a selectively uncoverable aperture therein located immediately above the tray so that hickory or charcoal may be inserted therein without the necessity of removing any parts from the machine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a partial vertical sectional view illustrating the interior components of the machine.

FIG. 6 is a transverse sectional detail taken along a plane passing through section line 6—6 in FIG. 5.

FIG. 7 is a partial end view of a selectively closeable aperture for permitting the introduction of smoking material into the machine.

Figure 1:
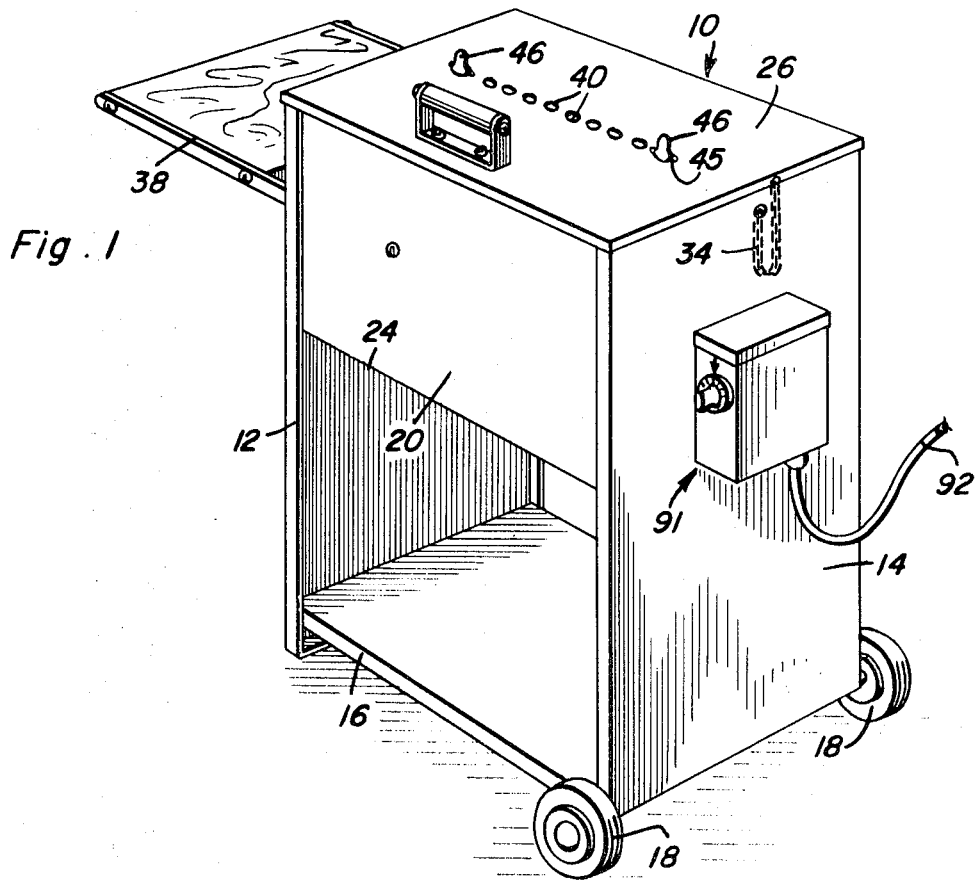
FIG. 1 is a perspective view of the present barbecue machine.
Figure 2:
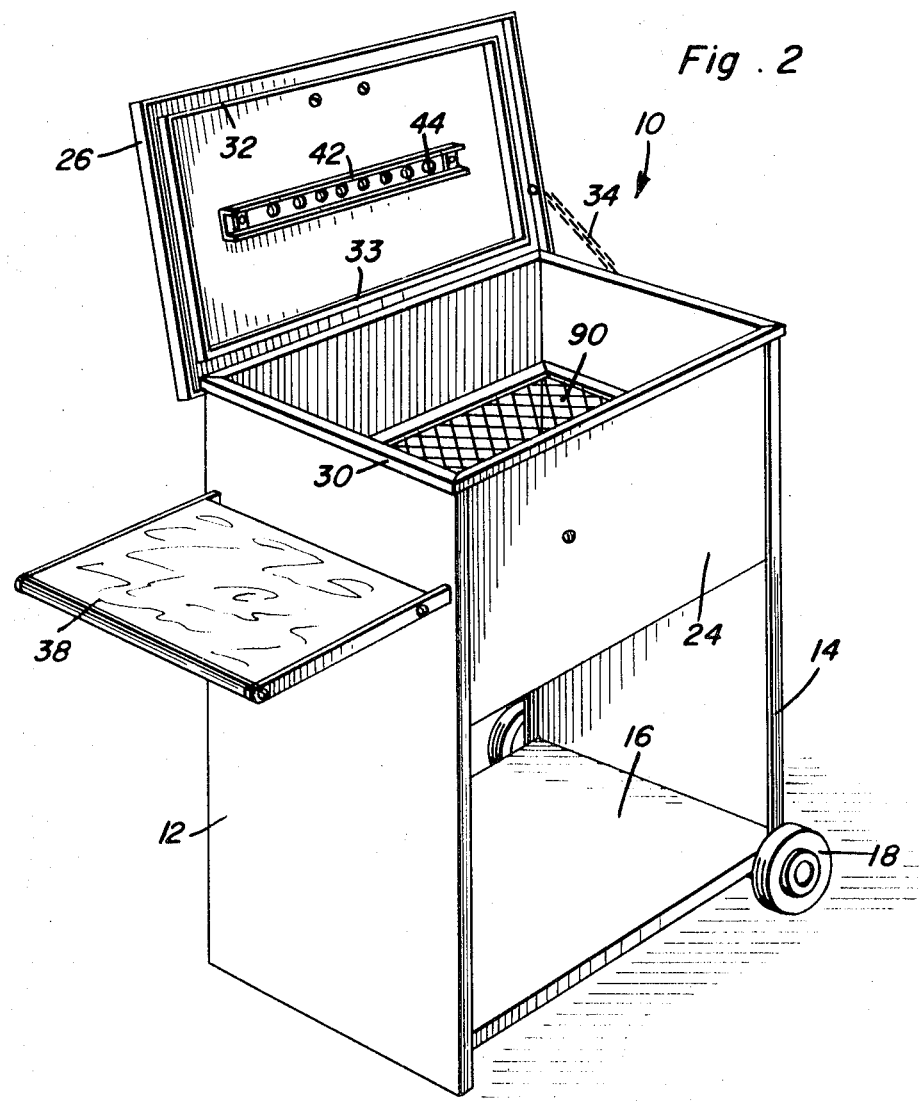
FIG. 2 is a view similar to FIG. 1 illustrating the cover of the machine in a lifted position.
Figure 3:
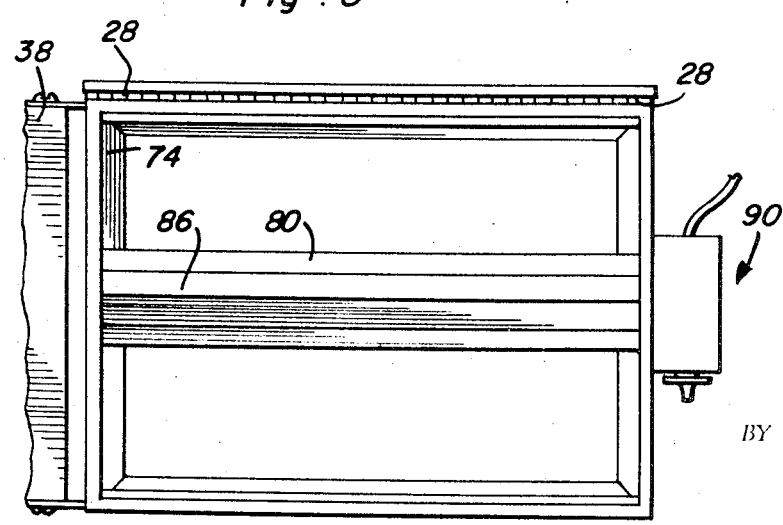
FIG. 3 is a partial top plan view of the opened machine with the grill being removed therefrom.

Referring to FIGS. 1 and 2, the barbecue machine of the present invention is generally indicated by reference numeral 10 and is seen to include two vertically disposed rectangular panels 12 and 14 connected together at the lower end portion thereof by a shelf 16. The lower edge of panel 12 extends below the shelf 16 and the intersection of panel 14 and shelf 16 is apertured to permit insertion of a wheel assembly 18 therethrough. The lower end of panel 12 is adapted to touch a ground supporting surface as does the wheel 18. The machine is rendered portable by pivoting the machine around the wheel assembly 18 and rolling the machine thereon.

An enclosure in the form of a generally U-shaped channel having side walls 20 and 22 is positioned so that the open ends thereof are disposed adjacent the interior surface of the panels 12 and 14. As will be noted from the figures, the base 24 of the channel is positioned approximately midway between the upper horizontally aligned edges of the vertical panels 12 and 14 and the shelf 16.

Referring particularly to FIG. 2, a cover or lid 26 is mounted to the upper end of the channel enclosure 24 by means of a piano hinge 28.

A peripheral flange 30 forms a rectangular lip bounding the upper edges of the channel and the vertical panel walls. A rectangular angle iron configuration 32 is attached to the underside of the cover 26 by means of welding or the like. This rectangular configuration is adapted to lie concentrically inwardly of the peripheral lip 30 so as to form a moisture retaining track for preventing moisture accumulated on the cover from dripping to the exterior enclosure surfaces. The track side 32 adjacent the hinge 28 has a horizontal flange 32 for forming a cup side which retains moisture when the lid is raised. When the lid is again lowered, the moisture will drop vertcally downward into a collection trough below. A chain 34 is connected between the cover and the enclosure for the purpose of retaining the cover in a raised position when so desired.

Referring to FIG. 1, the upper surface of cover 26 includes a handle 36 fastened thereto for the purpose of raising and lowering the cover. A carving board 38 is mounted in a cantilevered fashion from the vertical panel 12 to offer a great convenience to the user of the barbecue.

An air vent for the cover is provided by forming a number of aligned apertures 40 in the central body of the cover 26. As will be seen in FIG. 2, an elongated channel bracket 42 having holes 44 formed in the base thereof is mounted in overlying juxtaposed position with respect to the holes 40 formed in the cover. As indicated in FIG. 1, the end apertures are oblong in shape (45) and thumb screws or like fasteners 36 are inserted therein so that when the thumb screws are loosened, the bracket 42 may be moved to vary the registry between the holes 40 in the cover and the holes 44 in the bracket. By so adjusting the reigstry, the rate of hot air passage from the the enclosure can be regulated for maximum cooking efficiency and minimum smoke production from the cooking food.

Figure 4:
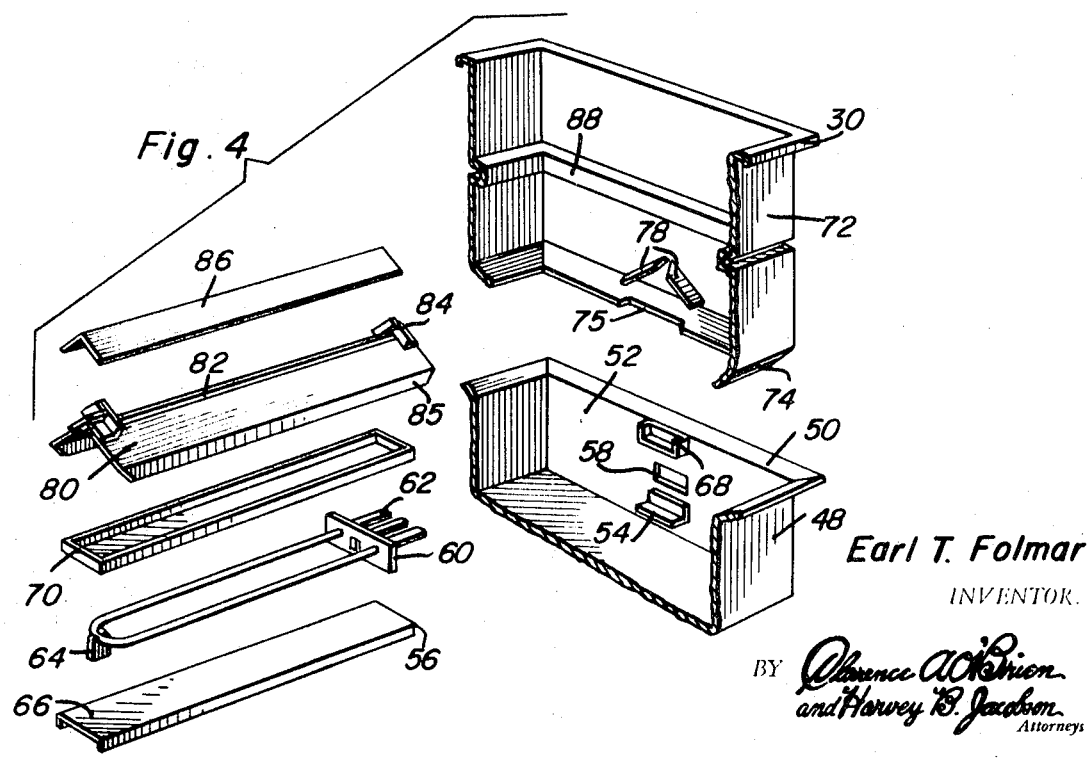
FIG. 4 is an exploded view illustrating the relative position of components comprising the heating assembly of the machine.

Refrerence is made to FIG. 4 which illustrates the vetrically aligned components of the electric heater assembly. The figure likewise illustrates the means for supporting the components within the enclosure 20. The supporting components include a tub-like trough 48 having an upwardly and outwardly beveled edge 50. The transverse ends 52 of the trough mount brackets 54 which support the transverse ends of the shelf 56 therebetween. A rectangular slot 58 is formed in the trough 48 immediately above the bracket 54 to permit the insertion of connector prongs 62 therethrough, the latter forming the electrical input connector of an elongated heater element 60 extending in overlying spaced relation with respect to the shelf 56. An insulative tab 64 is mounted on the outward end of the electrical element in oppositely disposed relation to the connector prongs 62. This tab is adapted to contact the end portion of the shelf as indicated by 66 for purposes of supporting the end of the heating element 60. Electrical power is provided to the prongs 62 from a controlled source external of the enclosure as hereinafter explained. A second bracket 68 similar to the bracket 54 is disposed in vertical aligned relation to the bracket 54 and immediately above the rectangular slot 58. An elongated tray 70 is supported at the transverse ends thereof by the bracket 68. As will be appreciated, a similar bracket is disposed on the opposite transverse wall of the trough for supporting an opposite end of the tray 70. The tray 70 is employed when a cooked food is to be smoked by a suitable smoking material such as hickory wood or charcoal. In order to achieve the smoking effect, hickory or like material is placed in tray 70 and is heated to smoking temperature by the heating element 60 that is positioned in underlying vertically aligned relation.

Beside providing means for supporting the heater element assembly components, the trough serves to collect drippings from the food being cooked on a grill which is positioned above the heating element as hereinafter explained. In order to guide the drippings into the trough, a conduit 72 is provided with a lower inwardly beveled edge 74 which seats upon the mating the beveled edge 50 of the trough. Each transverse end of the beveled edge 74 include a slit or notch 75 along the intermediate portion thereof to provide clearance for the tray 70 which is positioned immediately below the slit 75. The upper edge of the conduit 72 is rolled outwardly to form a rectangular lip 30. This lip bounds the upper edge of the closure 24 and the vertical panels 12 and 14 as previously mentioned.

Referring once again to FIG. 4, two angularly inclined and upwardly converging brackets 78 forming an inverted V are suitably attached to each transverse wall of conduit 72. The composite bracket permits the mounting of an inverted angle iron which extends between the transverse walls of conduit 72. In particular, the composite bracket renders support to the inverted angle iron along the underside of the apex portion thereof, contact being made along the end portions of the angle iron. The angle iron 80 is fabricated from two plates positioned perpendicularly to one another and having confronting apex edges in spaced relation thereby forming an elongated slit 82 along the apex of the angle iron. The plates are retained in right angled relation by means of angular tabs 84 connected at the outer ends of the angle iron apex portion. The outer longitudinal edges of the angle iron 80 is turned down at an angle with respect to each respective plate as seen in FIG. 6. When the angle iron is properly positioned within the barbecue, the latter mentioned downturned portion guides dripings, falling from the food above the angle bracket into trough 48.

As seen in FIG. 4, the slit 82 in the angle iron 80 is disposed in vertical alignment over tray 70 so that when smoking material such as hickory or charcoal is placed in tray 70, the smoke produced therefrom can pass through the slit 82 for eventual contact with the food being cooked. However, in order to prevent drippings from falling downwardly through the slit and into the tray, a drippings deflector 86 in the form of an elongated angle iron having a smaller outward span than the angle iron 80 is positioned in vertically aligned and spaced relation to the slit 82. In actual operation of the device, drippings destined to fall through slit 82 first fall on deflector 86 and then to the angle iron 80 for eventual deposit into trough 48. The deflector 86 is retained in spaced relation with respect to angle iron 80 by means of the previously mentioned tabs 84 which support the outward ends of the deflector 86 in capping relation to the angle iron 80. If the barbecue machine is to be used for straight grilling, without the use of smoking material, the tray 70 is removed. In this cooking mode, the angle iron 80 and the drippings deflector 86 may also be removed thereby permitting direct exposure between the heating element 60 and the food being cooked.

In order to mount a grill in vertically spaced relation with respect to the heating assembly components shown in FIG. 4, two oppositely disposed ledges 88 are formed in the interior surfaces of the confronting lateral walls of conduit 72. A grill 90 is removably positioned thereon as shown in FIGS. 5 and 6.

In order to control the heat emitted from the heating element 60, the contact prongs 62 thereof are connected to a heat control generally indicated by 91 and shown in FIG. 1. The heat control may be of any suitable conventional type such as a silicon control rectifier power control or functional equivalent. The unit may be mounted in a box which is connected to the external surface of vertical panel 14. A dial is provided for varying the settings from low to high heat. Power cord 92 provides power to the unit 91 and may be connected to a convenient power outlet.

Referring to FIG. 6, the details of machine construction includes an inturned flange 94 which depends from the upper edges of the channel enclosure walls 20 and 22. This flange provides a supporting surface for the rectangular lip 30 of the conduit 72. FIG. 6 clearly illustrates the seated relation of the conduit 72 in the trough 48, the seating engagement occurring along beveled edge 74 of the conduit 72 and the mating beveled edge 50 of trough 48. The seated beveled edges are generally indicated by reference numeral 96. In order to center the trough 48, a rectangular flange 98 is connected to the base wall 24 of the channel enclosure formed between the lateral walls 20 and 22.

An additional feature of the present invention is illustrated in FIGS. 5 and 7 wherein there is shown a selectably covered hole disposed immediately vertically above tray 70, the hole serving as an entry port for smoking material. The entry port becomes convenient to use during cooking, when additional smoking material is needed. A bushing 100 passing through the enclosure wall defines the entry port. A cover plate 102 is rotatably secured to the enclosure wall by a suitable fastener 104 and is adapted to normally occlude the port. By simply rotating the cover plate, access to the entry port is made available.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. An electric heating assembly for a food grill having an enclosure, the assembly comprising an electric heating element disposed inside the enclosure, means connected to the enclosure for supporting the elements in position, said latter means including an elongated shelf, the electric heating element mounting an insulating tab which contacts the shelf thereby maintaining the element in position, a grill positioned above the elements upon which food to be cooked is placed, shield means located below the grill and above the elements, the shield means further being in vertical alignment with the elements for preventing food drippings from falling onto the element, means for removably securing the shield means to the enclosure, and a tray positioned between the element and the shield means for retaining food smoking material therein, the shield means including an inverted elongated angle iron connected to the enclosure and having a slit formed in the apex portion thereof to permit passage therethrough of smoke produced by the smoking material to permeate the food on the grill, the shield means further including a drippings deflector connected to the enclosure and positioned in spaced overlying relation to the slit for preventing the passage of drippings into the tray.

2. An electric barbecue machine comprising an electric heating assembly, an enclosure for housing the assembly, a grill positioned in the enclosure and secured thereto for supporting food to be cooked, a trough disposed in the enclosure and serving as a retainer for food drippings, a conduit seated on the trough for guiding the drippings into the trough, an electric heating element disposed inside the trough, a shelf connected at opposite ends thereof to the trough for supporting the element in position, shield means located below the grill and above the element, mounting means attached to the conduit for permitting the resting support of the shield means thereon, the shield means further being in vertical alignment with the element for preventing drippings from falling on the element.

3. The machine set forth in claim 2 together with a hinged cover for closing the upper end of the conduit, and adjustable vent means connected to the cover for regulating ventilation through the enclosure.

4. The device set forth in claim 3 wherein the vent means includes a number of aligned holes formed in the cover and a slidably mounted bracket having holes therein secured to the underside of the cover together with fasteners for permitting sliding registry between the holes in the cover and the bracket to vary convection therethrough.

References Cited
UNITED STATES PATENTS

| | | | |
|---|---|---|---|
| 2,004,024 | 6/1935 | Van Voorst | 99—259X |
| 3,333,526 | 8/1967 | Kirkpatrick | 99—260 |
| 3,375,775 | 4/1968 | Folmar | 99—259 |
| 3,491,679 | 1/1970 | Kelly | 99—447 |

WILLIAM I. PRICE, Primary Examiner

A. O. HENDERSON, Assistant Examiner

U.S. Cl. X.R.

99—444, 447